US012689440B2

(12) United States Patent
Naganuma et al.

(10) Patent No.: US 12,689,440 B2
(45) Date of Patent: Jul. 21, 2026

(54) OPTICAL TRANSMIT DEVICE

(71) Applicant: 1FINITY Inc., Kawasaki (JP)

(72) Inventors: Tomohiro Naganuma, Kawasaki (JP); Shoichi Murakami, Kawasaki (JP)

(73) Assignee: 1FINITY Inc., Kawasaki (JP)

( * ) Notice: Subject to any disclaimer, the term of this patent is extended or adjusted under 35 U.S.C. 154(b) by 249 days.

(21) Appl. No.: 18/459,481

(22) Filed: Sep. 1, 2023

(65) Prior Publication Data

US 2024/0113786 A1 Apr. 4, 2024

(30) Foreign Application Priority Data

Sep. 29, 2022 (JP) ................................. 2022-156561

(51) Int. Cl.
H04B 10/588 (2013.01)
H04B 10/2575 (2013.01)

(52) U.S. Cl.
CPC ..... H04B 10/25759 (2013.01); H04B 10/588 (2013.01)

(58) Field of Classification Search
CPC .... H04B 10/505; H04B 10/564; H04B 10/58; H04B 10/588
See application file for complete search history.

(56) References Cited

U.S. PATENT DOCUMENTS

| | | | | |
|---|---|---|---|---|
| 2004/0131362 A1* | 7/2004 | Giaretta | ............... | H04B 10/564 |
| | | | | 398/135 |
| 2009/0214198 A1* | 8/2009 | Takahashi | ............ | H04B 10/504 |
| | | | | 398/1 |

| | | | | |
|---|---|---|---|---|
| 2010/0166436 A1* | 7/2010 | Hase | .................... | H04B 10/502 |
| | | | | 398/182 |
| 2011/0241778 A1 | 10/2011 | Chujo et al. | | |
| 2013/0343767 A1* | 12/2013 | Kajiya | ................ | H04B 10/588 |
| | | | | 398/183 |
| 2017/0163347 A1 | 6/2017 | Akiyama et al. | | |
| 2023/0208531 A1* | 6/2023 | Heo | .................... | H04B 10/501 |
| | | | | 398/159 |

FOREIGN PATENT DOCUMENTS

| | | |
|---|---|---|
| JP | 2011-217321 | 10/2011 |
| JP | 2013-66033 A | 4/2013 |
| JP | 2013-090128 | 5/2013 |
| JP | 2013-150154 | 8/2013 |

(Continued)

OTHER PUBLICATIONS

Jyo, Teruo et al., "An Over 67-GHz Bandwidth 21-dB Gain 4.5-Vppd Linear Modulator Driver for 100-GBd Coherent Optical Transmitter", IEEE Microwave and Wireless Components Letters, vol. 31, No. 6, pp. 705-708, Jun. 2021.

(Continued)

*Primary Examiner* — Nathan M Cors
(74) *Attorney, Agent, or Firm* — Fujitsu Intellectual Property Center

(57) ABSTRACT

An optical transmit device includes a conversion device configured to convert an electrical data signal into an optical signal, a control unit configured to change an adjustment value for peaking based on a baud rate of the optical signal, and a driver configured to change a band characteristic of the conversion device based on the adjustment value changed by the control unit.

12 Claims, 10 Drawing Sheets

(56)                    References Cited

FOREIGN PATENT DOCUMENTS

JP          2014-007578        1/2014
JP          2017-103682        6/2017

OTHER PUBLICATIONS

Sun, Tie et al., "Silicon Photonic Mach-Zehnder Modulator Driver for 800+GB/s Optical Links", 2021 IEEE BiCMOS and Compound Semiconductor Integrated Circuits and Technology Symposium (BCICTS), Dec. 2021.

Buchali, Fred et al., "CMOS DAC Supported 1.1 Tb/s$\lambda$ DWDM Transmission at 9.8 bit/s/Hz Over DCI Distances", Journal of Lightwave Technology, vol. 39, No. 4, pp. 1171-1178, Feb. 15, 2021.

Porto, Stefano et al., "Demonstration of a 2 x 800 GB/s/wave Coherent Optical Engine Based on an InP Monolithic Pic", Journal of Lightwave Technology, vol. 40, No. 3, pp. 664-671, Feb. 1, 2022.

Japanese Office Action mailed Jan. 27, 2026 for corresponding Japanese Patent Application No. 2022-156561, with English Translation, 7 pages.

* cited by examiner

<u>ST</u> OPTICAL TRANSMISSION SYSTEM

L1: BAND CHARACTERISTICS OF MAIN SIGNAL
L2: BAND CHARACTERISTICS OF DAC
L3: BAND CHARACTERISTICS OF CDM
L4: BAND CHARACTERISTICS OF OPTICAL TRANSMIT DEVICE
    (COMBINED BAND CHARACTERISTICS OF DAC AND CDM)

L3-H: BAND CHARACTERISTICS OF CDM(HIGH BAUD RATE)
L3-M: BAND CHARACTERISTICS OF CDM(MIDDLE BAUD RATE)
L3-L: BAND CHARACTERISTICS OF CDM(LOW BAUD RATE)

L1-H: BAND CHARACTERISTICS OF MAIN SIGNAL (HIGH BAUD RATE)
L1-L: BAND CHARACTERISTICS OF MAIN SIGNAL (LOW BAUD RATE)
L4:   BAND CHARACTERISTICS OF OPTICAL TRANSMIT DEVICE

FIG. 8A

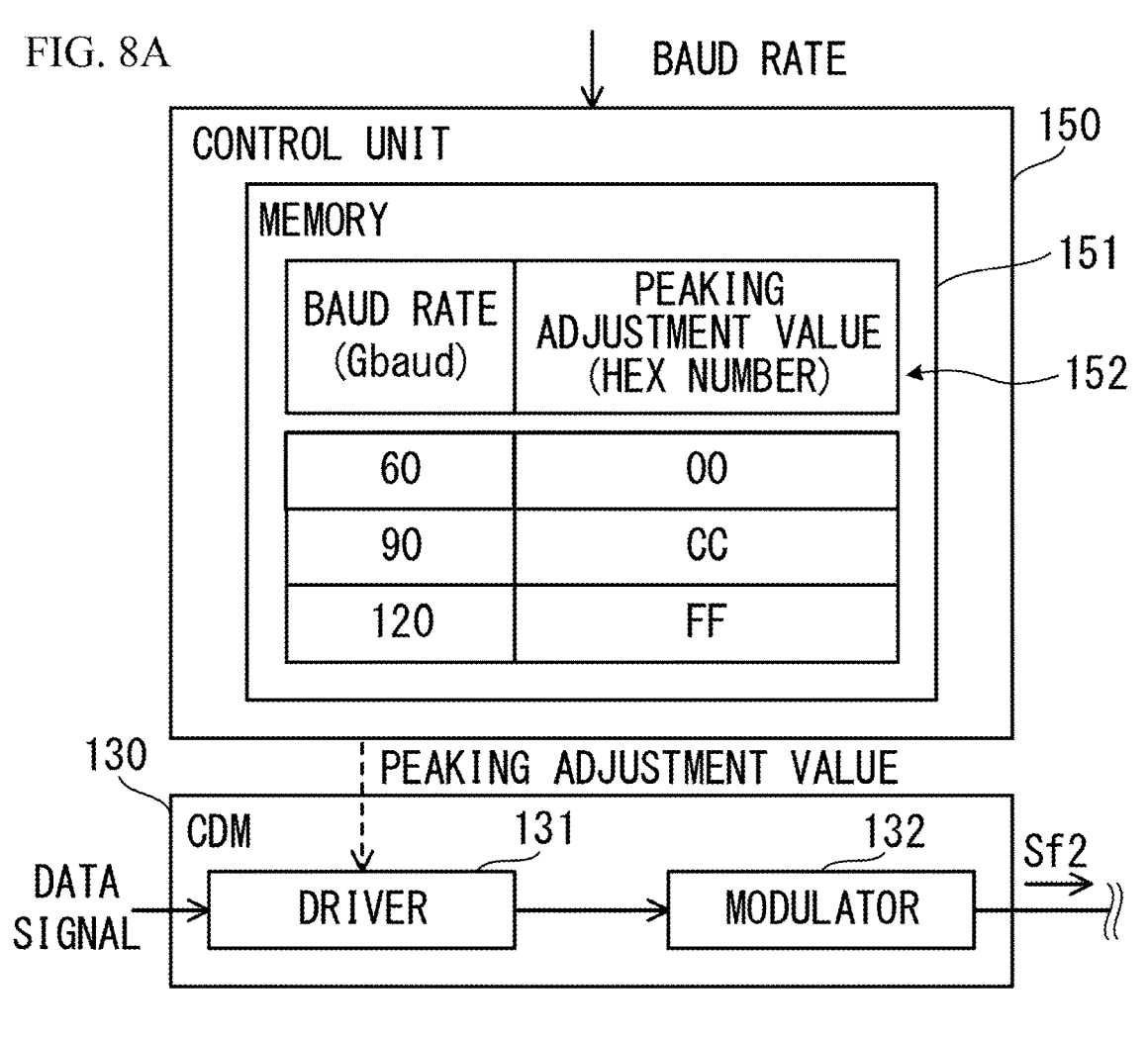

BAUD RATE

CONTROL UNIT                                              150

MEMORY                                                   151

| BAUD RATE (Gbaud) | PEAKING ADJUSTMENT VALUE (HEX NUMBER) |
|---|---|
| 60 | 00 |
| 90 | CC |
| 120 | FF |

152

130

PEAKING ADJUSTMENT VALUE

CDM            131                    132            Sf2

DATA SIGNAL → DRIVER → MODULATOR →

FIG. 8B

AMPLITUDE [dB]

L1-H: BAND CHARACTERISTICS OF MAIN SIGNAL (HIGH BAUD RATE)
L1-L: BAND CHARACTERISTICS OF MAIN SIGNAL (LOW BAUD RATE)
L4:   BAND CHARACTERISTICS OF OPTICAL TRANSMIT DEVICE

L4
L1-L
CHANGE
L1-H
L4

Nz
NOISE COMPONENT

FREQUENCY [GHz]

N-H

OPTICAL TRANSMIT DEVICE

CROSS-REFERENCE TO RELATED APPLICATION

This application is based upon and claims the benefit of priority of the prior Japanese Patent Application No. 2022-156561, filed on Sep. 29, 2022, the entire contents of which are incorporated herein by reference.

FIELD

A certain aspect of embodiments described herein relates to an optical transmit device.

BACKGROUND

There is known an optical transmit device capable of generating an optical signal having a desired optical waveform by performing digital signal processing on a data signal for transmission used as a drive signal for an optical modulator as disclosed in, for example, Japanese Patent Application Laid-Open No. 2017-103682.

Further, there is known a technique of converting a data signal amplified by an optical modulator driver into an optical signal by a semiconductor laser element. The optical modulator driver may have a characteristic called peaking in which the frequency response characteristic is particularly high in a certain frequency band as disclosed in, for example, Japanese Patent Application Laid-Open No. 2014-007578. In addition, various techniques related to peaking are known as disclosed in, for example, Japanese Patent Application Laid-Open Nos. 2011-217321, 2013-150154, and 2013-090128.

SUMMARY

Meanwhile, for the optical transmit device, research has been conducted to transmit an optical signal at a higher baud rate by utilizing peaking. For example, studies have been conducted to transmit an optical signal at a high baud rate such as 130 Gbaud (gigabaud) exceeding the range from a low baud rate such as 64 Gbaud to a medium baud rate such as 96 Gbaud.

However, when the baud rate is increased, the spectral width increases, and thus there is a possibility that the amount of band narrowing received in a reconfigurable optical add/drop multiplexer (ROADM) provided in the middle of an optical transmission line increases.

Therefore, it is preferable to achieve an optical transmit device capable of not only transmitting an optical signal at a high baud rate but also transmitting an optical signal in a range from a low baud rate to a medium baud rate, which is compatible with a wide range of baud rates.

Here, if the band characteristics of the optical transmit device are fixedly set to band characteristics capable of transmitting an optical signal at a low baud rate, for example, the band characteristics of an optical signal transmitted at a high baud rate may be distorted by the set band characteristics, and the transmission performance may be deteriorated. Thus, it is considered to fixedly set the band characteristics of the optical transmit device to band characteristics capable of transmitting an optical signal at a high baud rate. This makes it possible to transmit optical signals in a range from a low baud rate to a high baud rate without distortion.

However, when an optical signal is transmitted at a low baud rate in a state where the band characteristics of the optical transmit device are fixedly set to band characteristics capable of transmitting an optical signal at a high baud rate, there is no (or a small amount of) component of the optical signal in a region between the set band characteristics and the optical signal transmitted at a low baud rate. On the other hand, noise components of the optical transmit device may remain in this region. In the wavelength division multiplexing transmission, this noise component may deteriorate the signal quality of another optical signal adjacent to the optical signal. As described above, when the band characteristics of the optical transmit device are fixedly set to band characteristics capable of transmitting an optical signal at a high baud rate, the optical signal is not distorted in wavelength division multiplexing transmission using an optical signal transmitted at a low baud rate, but the transmission performance may be deteriorated due to noise components.

According to an aspect of the embodiments, there is provided an optical transmit device including: a conversion device configured to convert an electrical data signal into an optical signal; a control unit configured to change an adjustment value for peaking based on a baud rate of the optical signal; and a driver configured to change a band characteristic of the conversion device based on the adjustment value changed by the control unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8A illustrates a control table, and FIG. 8B illustrates a change in the band characteristics of the optical transmit device.

DESCRIPTION OF EMBODIMENTS

Hereinafter, embodiments of the present disclosure will be described with reference to the drawings.

First Embodiment

Figure 1A:
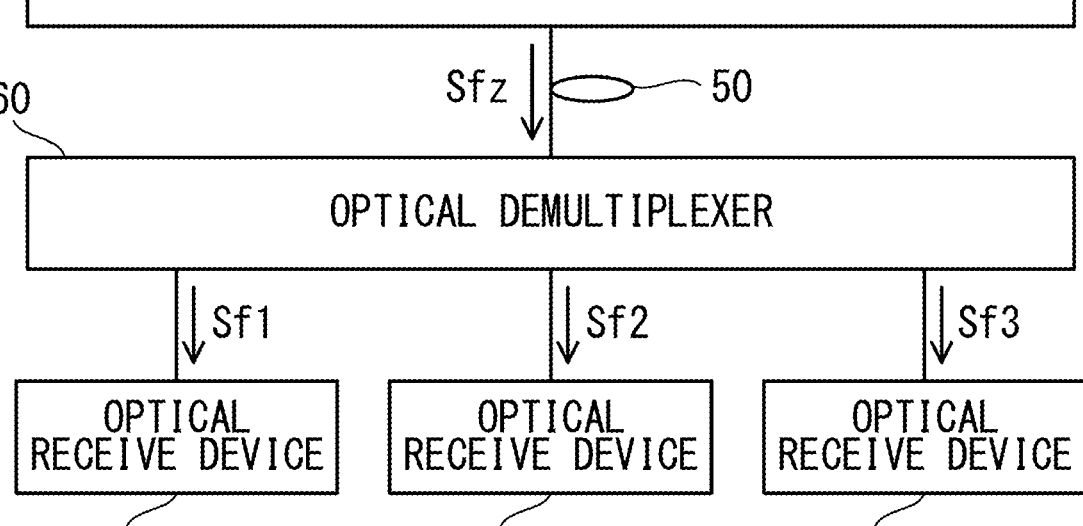
FIG. 1A illustrates an example of an optical transmission system.

As illustrated in FIG. 1A, an optical transmission system ST includes a plurality of optical transmit devices 10, 20, and 30 and a plurality of optical receive devices 70, 80, and 90. Each of the optical transmit devices 10, 20, and 30 is optically connected to an optical multiplexer (specifically, a multiplexer) 40. Each of the optical receive devices 70, 80, and 90 is optically connected to an optical demultiplexer (specifically, a demultiplexer) 60. The optical multiplexer 40 and the optical demultiplexer 60 are connected via an optical transmission line 50. The optical transmission line 50 includes, for example, an optical fiber.

The optical transmit devices 10, 20, and 30 transmit main signals having different center frequencies. Although the main signal is described as an example of the optical signal in the present embodiment, control signals for controlling the optical transmit devices 10, 20, and 30 and the optical receive device 70, 80, and 90 may be employed instead of the main signal. For example, the optical transmit device 20 transmits a main signal Sf2 having a central frequency f2. Since the optical transmit devices 10 and 30 are basically the same as the optical transmit device 20, a detailed description thereof will be omitted.

Figure 1B:
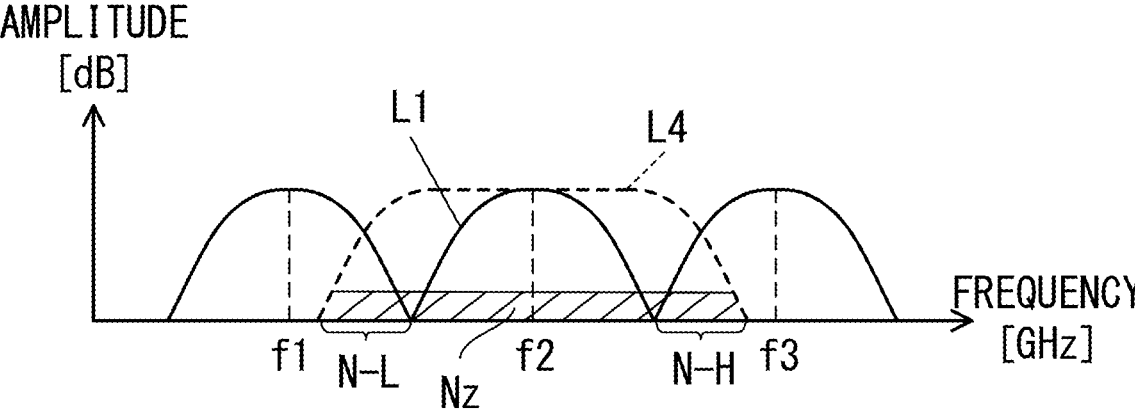
FIG. 1B illustrates an example of band characteristics of a wavelength division multiplexing (WDM) signal and band characteristics of an optical transmit device.

The optical multiplexer 40 generates a WDM signal Sfz by multiplexing the main signals Sf1, Sf2, and Sf3 transmitted from the optical transmit devices 10, 20, and 30, respectively. As a result, the optical multiplexer 40 transmits the WDM signal Sfz to the optical transmission line 50. When the optical multiplexer 40 multiplexes the main signals Sf1, Sf2, and Sf3, as illustrated in FIG. 1B, the interval between the adjacent main signals Sf1 and Sf2 and the interval between the adjacent main signals Sf2 and Sf3 are narrowed and arranged to generate the WDM signal Sfz. This allows for more efficient use of frequencies.

The optical demultiplexer 60 receives the WDM signal Sfz that has passed through the optical transmission line 50. The optical demultiplexer 60 demultiplexes the WDM signal Sfz into the main signals Sf1, Sf2, and Sf3. The optical demultiplexer 60 transmits, for example, the main signal Sf2 to the optical receive device 80. Thus, the optical receive device 80 receives the main signal Sf2. Since the optical receive devices 70 and 90 are basically the same as the optical receive device 80, a detailed description thereof will be omitted.

Here, as illustrated in FIG. 1B, the band characteristics L4 of the optical transmit device 20 are sufficiently secured with respect to the band characteristics L1 of the main signal Sf2. This ensures that the shape of the band characteristics L1 of the main signal Sf2 is not distorted due to the bandwidth characteristics L4 of the optical transmit device 20. As a result, the degradation in the signal quality of the main signal Sf2 can be reduced.

When the main signal Sf2 is transmitted, components Nz of noise generated in the optical transmit device 20 (hereinafter referred to as noise components) are also transmitted along with the main signal Sf2. The noise components Nz exist in the region from the lowest frequency to the highest frequency of the band characteristics L4 of the optical transmit device 20. Therefore, the noise components Nz contain first adjacent noise components N-L that exist in the region from the lowest frequency of the band characteristics L4 of the optical transmit device 20 to the lowest frequency of the band characteristics L1 of the main signal Sf2. The noise components Nz also contain second adjacent noise components N-H that exist in the region from the highest frequency of the band characteristics L1 to the highest frequency of the band characteristics L4 of the optical transmit device 20.

Thus, a region where there are no (or few) components of the main signal Sf2 and only the first adjacent noise components N-L are present appears, outside the band characteristics L1 of the main signal Sf2 at the low-frequency side. In such a case, when another main signal Sf1 adjacent to the main signal Sf2 is arranged in this region, the first adjacent noise components N-L are superimposed on the main signal Sf1. This results in a decrease in the signal quality of the main signal Sf1.

Similarly, there is a region where there are no (or few) components of the main signal Sf2 and only the second adjacent noise components N-H are present, outside the band characteristics L1 of the main signal Sf2 at the high-frequency side. In such a case, when another main signal Sf3 adjacent to the main signal Sf2 is arranged in this region, the second adjacent noise components N-H are superimposed on the main signal Sf3. This results in a decrease in the signal quality of the main signal Sf3. As a result, the signal quality of the WDM signal Sfz may be degraded and the transmission performance of the optical transmission system ST may deteriorate.

To reduce such degradation of the transmission performance, it is desirable to make the shape of the band characteristics L4 of the optical transmit device 20 similar to the shape of the band characteristics L1 of the main signal Sf2 to prevent or reduce the generation of the first adjacent noise components N-L and the second adjacent noise components N-H. Although details will be described later, in the present embodiment, the shape of the band characteristics L4 is adaptively adjusted to approach the shape of the band characteristics L1 by utilizing peaking. Thus, even when the shape of the band characteristics L1 change in accordance with the baud rate of the main signal Sf2, the band characteristics L4 having a shape similar to the shape of the band characteristics L1 can be secured.

The optical transmit device 20 will be described in detail with reference to FIG. 2. Since the optical transmit devices 10 and 30 basically have the same configuration as that of the optical transmit device 20, a detailed description thereof will be omitted.

Figure 2:
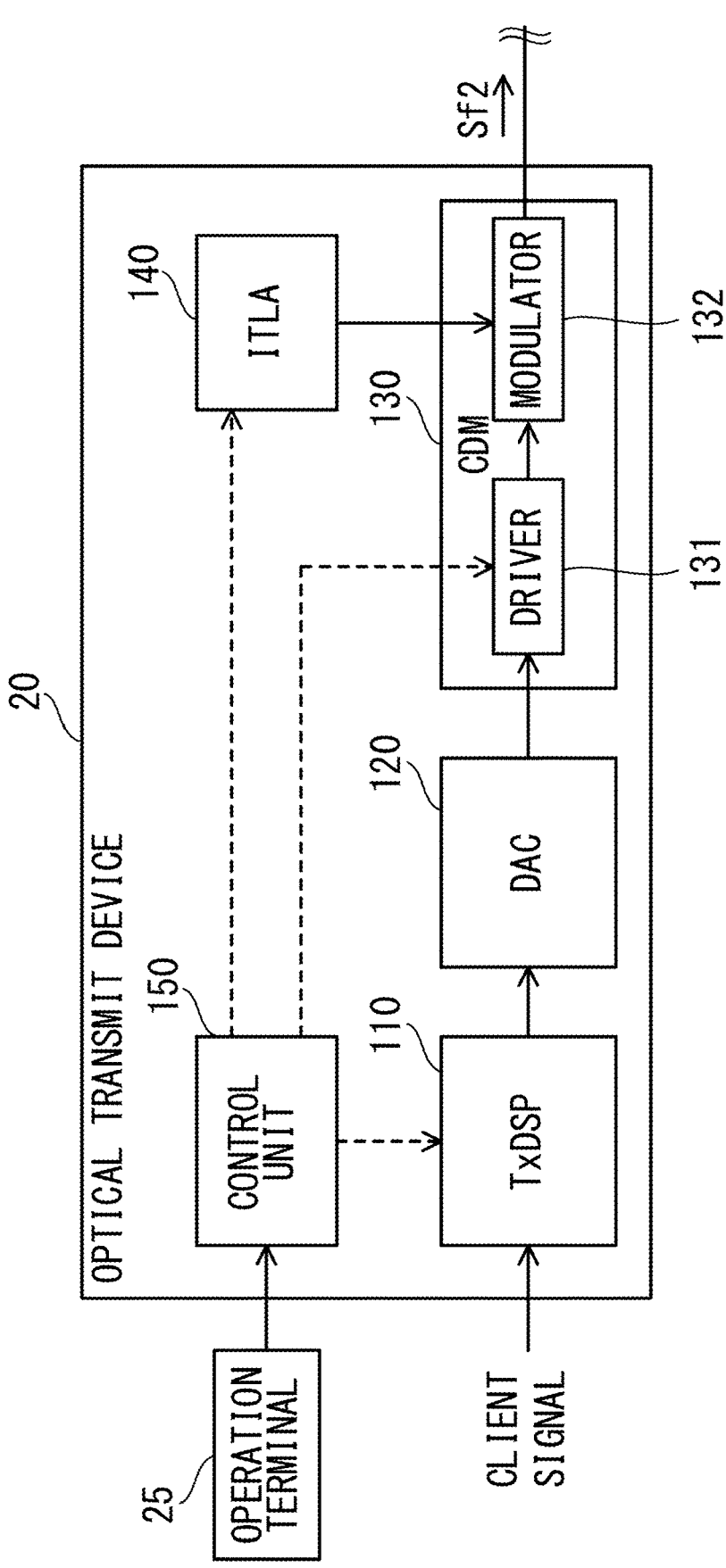
FIG. 2 is a block diagram illustrating an example of the optical transmit device.

As illustrated in FIG. 2, the optical transmit device 20 includes a transmitting-end digital signal processor (DSP, hereinafter, referred to as TxDSP) 110 and a digital analogue converter (DAC) 120. The optical transmit device 20 includes a CDM 130, an integrable tunable laser assembly (ITLA) 140, and a control unit 150. The CDM 130 is an example of a conversion device. The CDM 130 is an integrated circuit in which a driver (specifically, an optical modulator driver circuit) 131 and a modulator (specifically, an optical modulator) 132 are stored in one package.

The TxDSP 110 receives an electrical client signal, which is in digital form, from the client network. The client signal is, for example, an Ethernet (registered trademark) signal. The TxDSP 110 performs various digital signal processing. For example, the TxDSP 110 converts the client signal into an optical channel transport unit (OTU) frame, generates forward error correction (FEC) as an example of an error correction code for the OTU frame, and inserts the FEC into the OTU frame. The TxDSP 110 performs digital modulation processing in accordance with a baud rate and a modulating method (specifically, a multi-value modulating method) set by the control unit 150, thereby mapping the bit data of the OTU frame to symbols. The TxDSP 110 pre-compensates the OTU frame for various losses occurring in the optical transmit device 20. For example, the TxDSP 110 performs skew compensation, band characteristic compensation, and the like. The TxDSP 110 outputs the compensated OTU frame to the DAC 120 as a data signal.

The DAC 120 converts the data signal from digital format to analog format and outputs it to the driver 131 of the CDM 130. The driver 131 amplifies the data signal. The amplified data signal is used as a drive signal for the modulator 132. The modulator 132 modulates the transmission light (i.e., laser light) input from the ITLA 140 based on the data signal to generate the main signal Sf2 having a desired optical waveform. That is, the demodulator 132 converts the data signal into the main signal Sf2. The modulator 132 outputs the main signal Sf2 to the optical multiplexer 40. In this manner, the CDM 130 converts the data signal into the main signal Sf2 and transmits it.

The control unit 150 includes a processor and a memory, and controls each operation of the TxDSP 110, the CDM 130 (specifically, the driver 131), and the ITLA 140 as illustrated in FIG. 2. The processor includes, for example, a central processing unit (CPU). The memory includes a volatile memory such as a random-access memory (RAM) and a non-volatile memory such as a read only memory (ROM). The control unit 150 may be a field programmable gate array (FPGA) or an application specific integrated circuit (ASIC).

The control unit 150 performs various settings on the TxDSP 110 and the driver 131 according to the control of an operation terminal 25. The operation terminal 25 may be a personal computer (PC) or a smart terminal (for example, a tablet terminal). Although details will be described later, for example, when a signal type including a baud rate, a multilevel modulation method, a frame format, and the like is input from the operation terminal 25 to the control unit 150, the control unit 150 determines or calculates a peaking adjustment value corresponding to the baud rate, and sets the peaking adjustment value in the driver 131.

Figure 3:
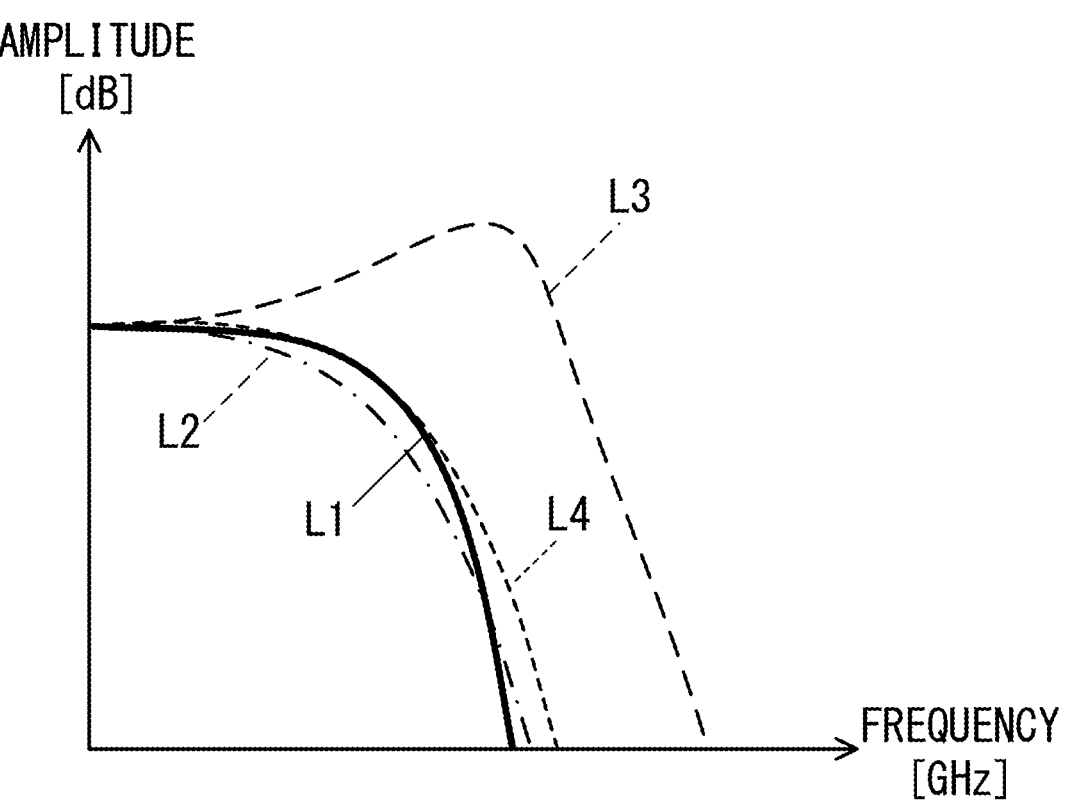
FIG. 3 illustrates band characteristics of the optical transmit device.

With reference to FIG. 3 and FIG. 4, the band characteristics and the like of the optical transmit device 20 will be described. If necessary, the following documents can be referred to.

(1) Teruo J Y O, et al., "An Over 67-GHz Bandwidth 21-dB Gain 4.5-VppdLinear Modulator Driver for 100-GBd Coherent Optical Transmitter", IEEE MICRO-WAVE AND WIRELESS COMPONENTS LETTERS, Vol. 31, No. 6, pp. 705-708, June, 2021

(2) Tie S U N, et al., "Silicon Photonic Mach-Zehnder Modulator Driver for 800+Gb/s Optical Links", 2021 IEEE BiCMOS and Compound Semiconductor Integrated Circuits and Technology Symposium (BCICTS), December, 2021

The band characteristics (specifically, frequency characteristics or gain characteristics) of the optical transmit device 20 are expressed as band characteristics obtained by combining band characteristics of devices through which data signals are transmitted among various devices included in the optical transmit device 20. In the present embodiment, as described above, the data signal passes through the DAC 120 and the CDM 130 as devices. On the other hand, the data signal does not pass through the ITLA 140 as a device. Therefore, as illustrated in FIG. 3, the band characteristics L4 of the optical transmit device 20 are expressed as band characteristics obtained by combining the band characteristics L2 of the DAC 120 and the band characteristics L3 of the CDM 130.

Here, in order not to distort the shape of the band characteristics L1 of the main signal Sf2, it is desirable that the shape of the band characteristics L4 of the optical transmit device 20 is slightly larger than the shape of the band characteristics L1 of the main signal Sf2, and the two shapes are similar to each other. Accordingly, as described above, the noise components existing in the region between the band characteristics L4 of the optical transmit device 20 and the band characteristics L1 of the main signal Sf2 are reduced, and the deterioration in the signal quality of the main signal Sf2 is reduced.

Here, the driver 131 included in the CDM 130 has a characteristic or function called peaking that amplifies the magnitude component in the band characteristics L3 of the CDM 130 to extend the band characteristics L3. In the present embodiment, such a characteristic or function is referred to as a peaking characteristic. Therefore, as illustrated in FIG. 3, even when the band characteristics L2 of the DAC 120 are insufficient (or inadequate) with respect to the band characteristics L1 of the main signal Sf2, the band characteristics L4 of the optical transmit device 20 can be extended by utilizing the peaking characteristic to extend the band characteristics L3 of the CDM 130.

Figure 4A:
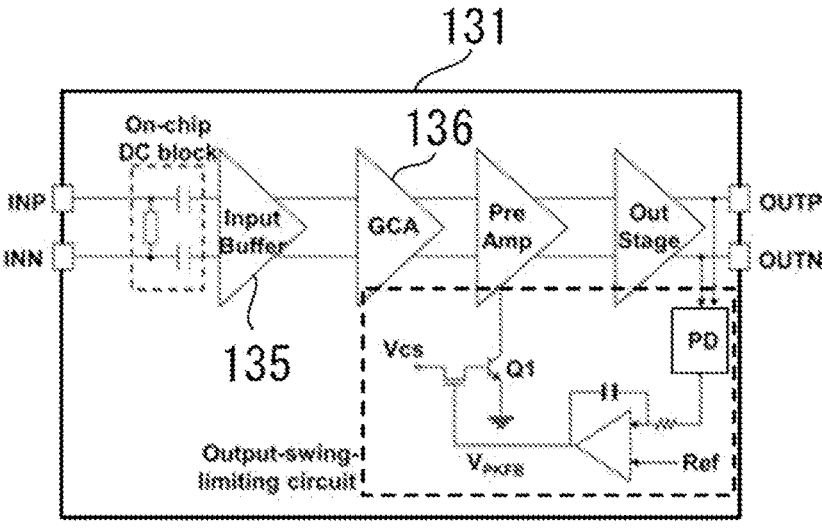
FIG. 4A is an example of a circuit diagram of a driver.
Figure 4B:
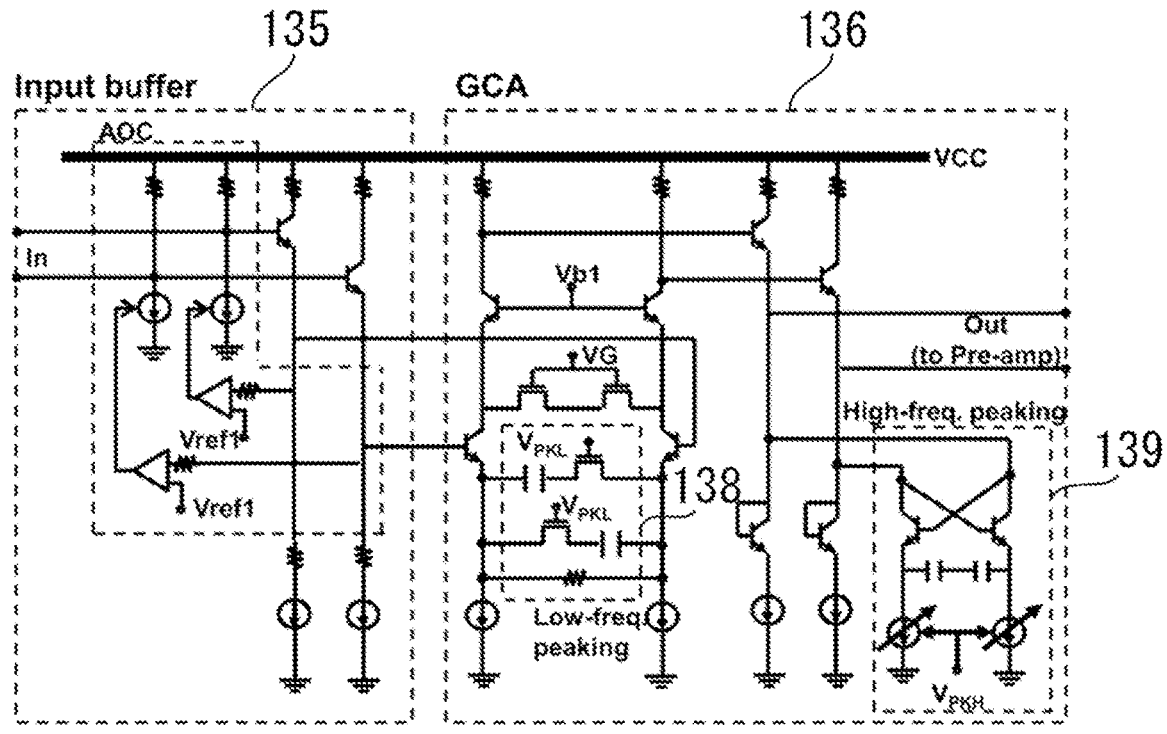
FIG. 4B is an example of a circuit diagram of an input buffer and a circuit diagram of a gain-controlled amplifier (GCA).

As illustrated in FIG. 4A, the driver 131 includes an input buffer 135 and a GCA 136. The input buffer 135 temporarily stores the data signal output from the DAC 120 through differential input terminals INP and INN. The GCA 136 acquires the data signal from the input buffer 135, amplifies the acquired data signal, and outputs the amplified signal to a subsequent circuit. The subsequent circuit includes a preamplifier and an output stage, and outputs the amplified data signal to the modulator 132 via differential output terminals OUTP and OUTN. The GCA 136 exhibits the peaking characteristic. More specifically, as illustrated in FIG. 4B, the GCA 136 includes a first circuit block 138 that adjusts the peaking of low frequencies. The GCA 136 also includes a second circuit block 139 that adjusts the peaking of high frequencies. By adjusting the values of the voltages applied to the first circuit block 138 and the second circuit block 139 by the control unit 150, it is possible to amplify the amplitude components to expand the band characteristics L3 of the CDM 130. In addition, by adjusting the values of the voltages applied to the first circuit block 138 and the second circuit block 139 by the control unit 150, it is possible to reduce the band characteristics L3 of the CDM 130 by reducing the amplitude components.

Therefore, if the baud rate of the main signal Sf2 and a constant (hereinafter, referred to as a peaking adjustment value) corresponding to the value of the voltage are associated with each other in advance using a control table, a formula, or the like, the peaking adjustment value corresponding to the baud rate is determined or calculated. Accordingly, the value of the voltage corresponding to the peaking adjustment value is specified, and the band characteristics L3 of the CDM 130 is extended or reduced.

Figure 5:
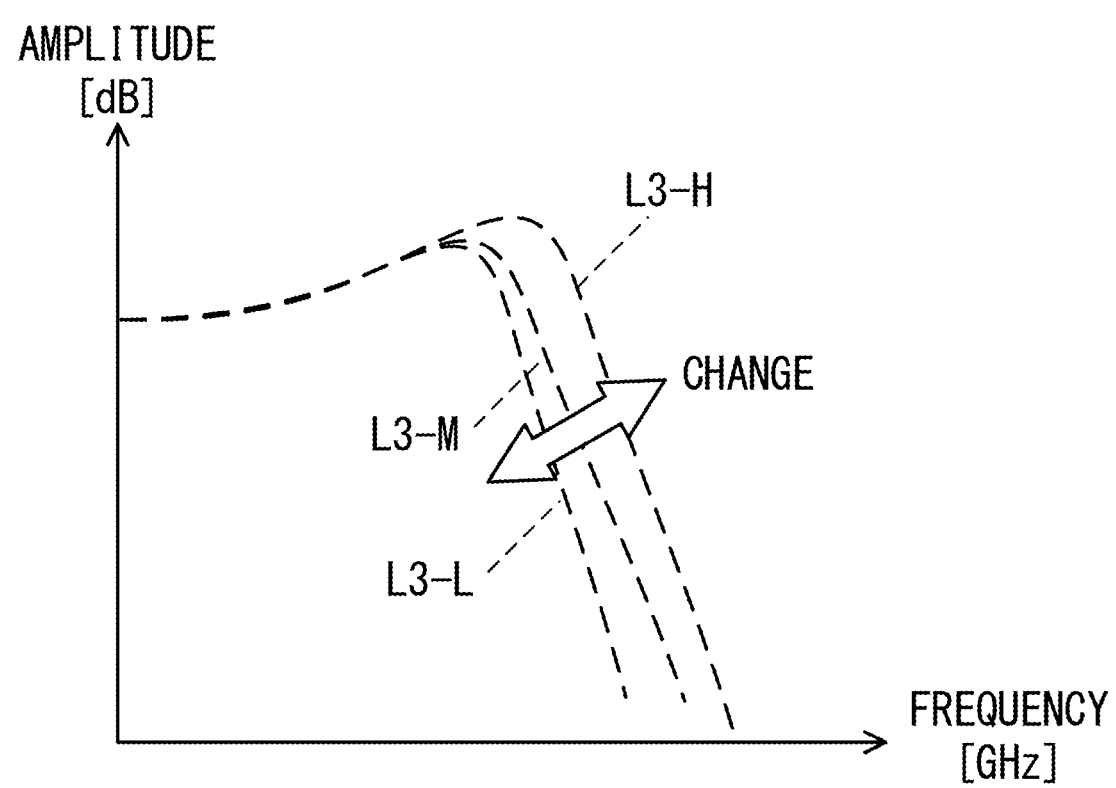
FIG. 5 illustrates a change in band characteristics of a coherent driver modulator (CDM).

For example, as illustrated in FIG. 5, the driver 131 can extend the band characteristics L3-M of the CDM 130 corresponding to a medium baud rate to the band characteristics L3-H of the CDM 130 corresponding to a high baud rate. Similarly, the driver 131 can reduce the band characteristics L3-M of the CDM 130 corresponding to a medium baud rate to the band characteristics L3-L of the CDM 130 corresponding to a low baud rate. Therefore, when the band characteristics L2 of the DAC 120 and the band characteristics L3-H of the CDM 130 are combined, the band characteristics L4 of the optical transmit device 20 are extended. Conversely, when the band characteristics L2 of the DAC 120 and the band characteristics L3-L of the CDM 130 are combined, the band characteristics L4 of the optical transmit device 20 are reduced.

Figure 6:
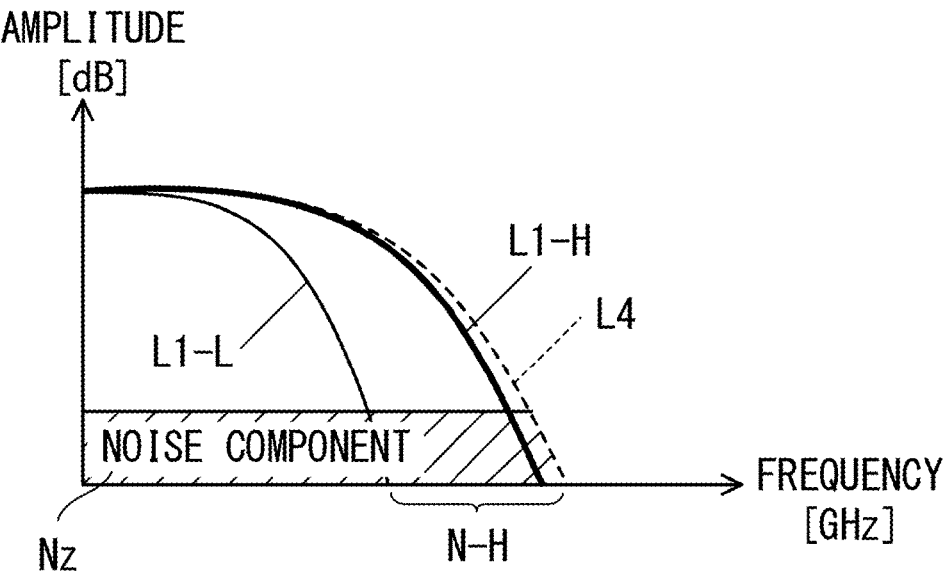
FIG. 6 illustrates an example of noise components superimposed on another adjacent main signal.

Therefore, when the band characteristics L1 of the main signal Sf2 are the band characteristics L1-H corresponding to a high baud rate as illustrated in FIG. 6, the shape of the band characteristics L4 of the optical transmit device 20 becomes similar to the shape of the band characteristics L1-H by utilizing the peaking characteristic. That is, the driver 131 determines the band characteristics L3-H of the CDM 130 (see FIG. 5) so that the shape of the band characteristics L4 of the optical transmit device 20 becomes similar to the shape of the band characteristics L1-H.

On the other hand, even when the band characteristics L1 of the main signal Sf2 are the band characteristics L1-L corresponding to the low baud rate, the shape of the band characteristics L4 of the optical transmit device 20 becomes similar to the shape of the band characteristics L1-L by utilizing the peaking characteristic. That is, the driver 131 determines the band characteristics L3-L of the CDM 130 (see FIG. 5) so that the shape of the band characteristics L4 of the optical transmit device 20 becomes similar to the shape of the band characteristics L1-L.

As illustrated in FIG. 6, when the band characteristics L1 of the main signal Sf2 are the band characteristics L1-L corresponding to a low baud rate, the bandwidth of frequencies is narrower than that of the band characteristics L1-H. When the band characteristics L4 of which the shape is similar to the shape of the band characteristics L1-H are fixedly set, the band characteristics L4 become excessively wider than the band characteristics L1-L. As a result, there appears a region between the band characteristics L4 and the band characteristics L1-L where there are no (or few) components of the main signal Sf2 and only the second adjacent noise components N-H are present. In such a case, the signal quality of another main signal Sf3 adjacent to the main signal Sf2 transmitted at a low baud rate may be degraded by the second adjacent noise components N-H.

However, as described above, in the present embodiment, even when the band characteristics L1 of the main signal Sf2 are the band characteristics L1-L corresponding to a low baud rate, the shape of the band characteristics L4 of the optical transmit device 20 becomes similar to the shape of the band characteristics L1-L by utilizing the peaking characteristic. As a result, a region where only the second adjacent noise components N-H are present does not appear, or this region is very small. As a result, it is possible to reduce the deterioration in the signal quality of the main signal Sf3 caused by the second adjacent noise components N-H in the transmission of the WDM signal, and the degradation in transmission performance in the optical transmission system ST can be avoided.

The low baud rate in the present embodiment can be 60 Gbaud or 64 Gbaud, for example. The medium baud rate in the present embodiment can be 90 Gbaud or 96 G baud, for example. The high baud rate in the present embodiment can be 120 Gbaud or 130 Gbaud, for example.

Next, the operation of the control unit 150 in accordance with the first embodiment will be described with reference to FIG. 7, FIG. 8A, and FIG. 8B.

Figure 7:
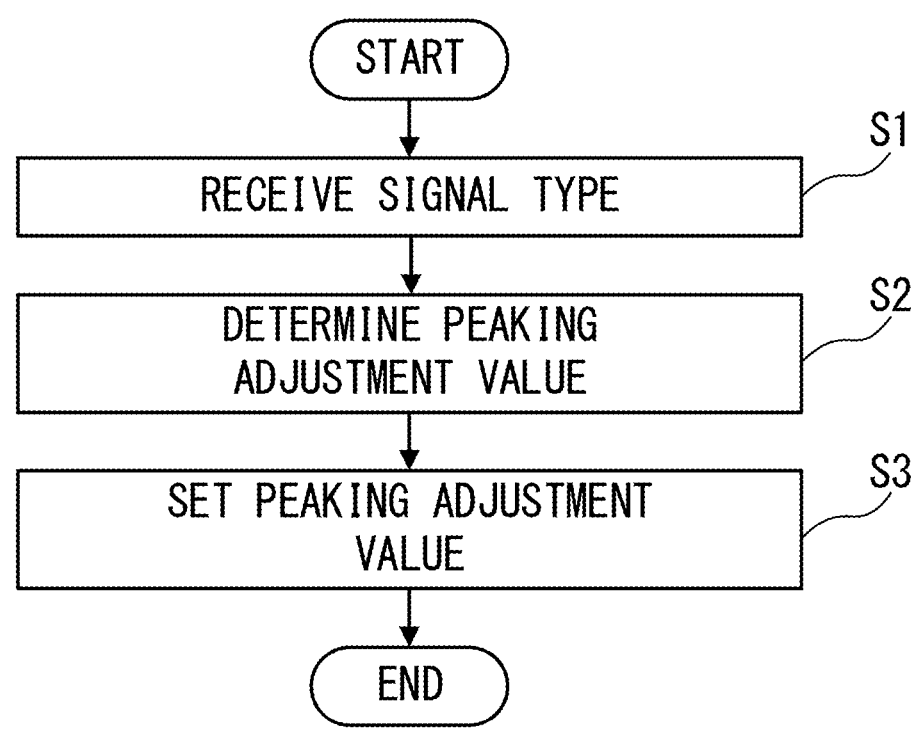
FIG. 7 is a flowchart illustrating an operation of a control unit in accordance with the first embodiment.

First, as illustrated in FIG. 7, the control unit 150 receives a signal type input from the operation terminal 25 (step S1). As described above, the signal type includes the baud rate, the modulating method, the frame format, and the like of the main signal Sf2. The control unit 150 receives the signal type as the setting of the main signal Sf2.

When the signal type is received, the control unit 150 determines the peaking adjustment value (step S2). As illustrated in FIG. 8A, the control unit 150 includes a memory 151, and the memory 151 stores a control table 152. In the control table 152, a correspondence relationship between the baud rate and the peaking adjustment value is defined. Therefore, when the control unit 150 receives the signal type, the control unit 150 can determine the peaking adjustment value corresponding to the baud rate included in the signal type. In the control table 152, as the baud rate decreases, the peaking adjustment value decreases. That is, in the control table 152, a smaller peaking adjustment value is registered for a smaller baud rate. In addition, the peaking adjustment value in accordance with the first embodiment is expressed in hexadecimal format, but may be expressed in format other than hexadecimal format.

When the peaking adjustment value is determined, the control unit 150 sets the peaking adjustment value in the driver 131 (step S3) and ends the process. As a result, a voltage value corresponding to the peaking adjustment value is applied to the first circuit block 138 and the second circuit block 139 (see FIG. 4B), and the band characteristics L3 of the CDM 130 change.

Therefore, for example, when a high baud rate is included in the signal type, as illustrated in FIG. 8B, the shape of the band characteristics L4 of the optical transmit device 20 becomes similar to the shape of the band characteristics L1-H of the main signal Sf2 transmitted at a high baud rate. When the low baud rate is included in the signal type, as illustrated in FIG. 8B, the shape of the band characteristics L4 of the optical transmit device 20 becomes similar to the shape of the band characteristics L1-L of the main signal Sf2 transmitted at a low baud rate. As described above, the optical transmit device 20 of the first embodiment can secure the band characteristics L4 corresponding to the baud rate of the main signal Sf2.

Second Embodiment

Next, the operation of the control unit 150 in accordance with a second embodiment will be described with reference to FIG. 9 and FIG. 10.

Figure 9:
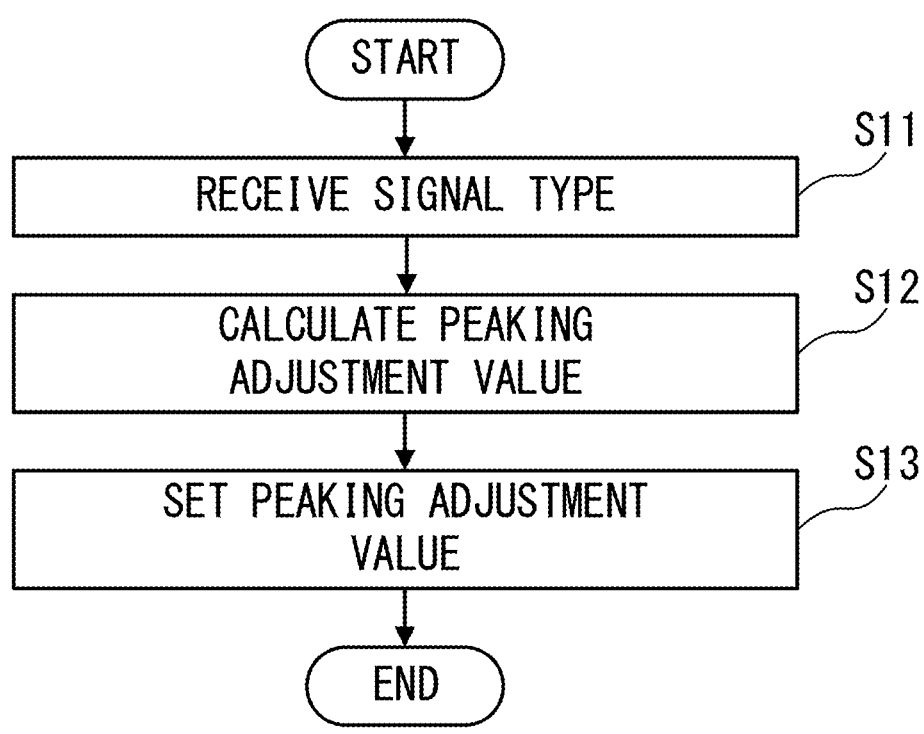
FIG. 9 is a flowchart illustrating an example of an operation of a control unit in accordance with a second embodiment.
Figure 10:
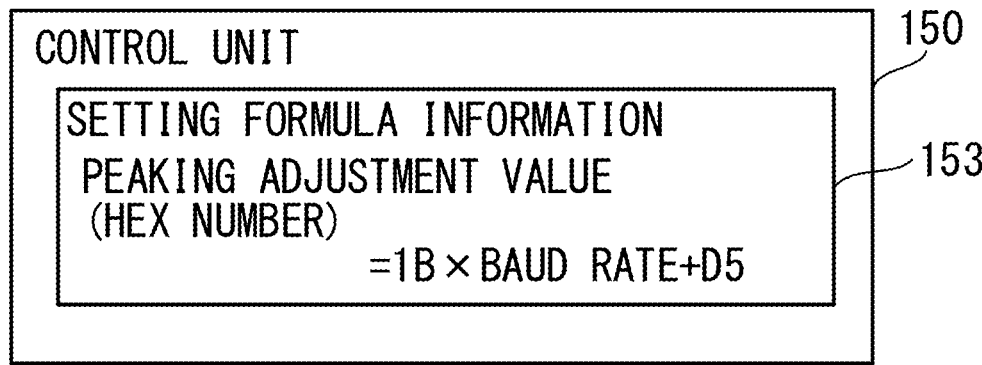
FIG. 10 illustrates an example of formula information.

First, as illustrated in FIG. 9, the control unit 150 receives a signal type output from the operation terminal 25 (step S11). Since the process of step S11 is basically the same as the process of step S1, a detailed description thereof will be omitted.

Upon receiving the signal type, the control unit 150 calculates the peaking adjustment value (step S12). Here, as illustrated in FIG. 10, the control unit 150 holds setting formula information 153. That is, formula information is set in advance in the control unit 150. The formula information is information including the peaking adjustment value (hexadecimal)=1B (hexadecimal)×baud rate+D5 (hexadecimal). Constants such as 1B (hexadecimal) and D5 (hexadecimal) can be appropriately determined in accordance with design, experiment, or the like.

As described above, the correspondence relationship between the baud rate and the peaking adjustment value is defined in the control unit 150. Therefore, when the control unit 150 receives the signal type, the control unit 150 can calculate the peaking adjustment value corresponding to the baud rate included in the signal type. In the formula information, as the baud rate decreases, the peaking adjustment value decreases. That is, in the formula information, a smaller peaking adjustment value is calculated for a smaller baud rate. In addition, although the peaking adjustment value of the second embodiment is expressed in hexadecimal format, but may be expressed in other than hexadecimal format.

When the peaking adjustment value is calculated, the control unit 150 sets the peaking adjustment value in the driver 131 (step S13) and ends the process. As a result, a voltage value corresponding to the peaking adjustment value is applied to the first circuit block 138 and the second circuit block 139 (see FIG. 4B), and the band characteristics L3 of the CDM 130 change.

Therefore, for example, when a high baud rate is included in the signal type, the shape of the band characteristics L4 of the optical transmit device 20 becomes similar to the shape of the band characteristics L1-H of the main signal Sf2 transmitted at a high baud rate. When a low baud rate is included in the signal type, the shape of the band characteristics L4 of the optical transmit device 20 becomes similar to the shape of the band characteristics L1-L of the main signal Sf2 transmitted at a low baud rate. As described above, even in the optical transmit device 20 of the second embodiment, it is possible to secure the band characteristics L4 corresponding to the baud rate of the main signal Sf2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical transmit device comprising:
   a conversion device that converts an electrical data signal into an optical signal;
   controller that changes an adjustment value for peaking according to a baud rate; and
   a driver that changes a band characteristic based on the adjustment value changed by the controller,
   the driver changes the band characteristic by adjusting a voltage value of the driver based on the adjustment value, and
   a signal type including the baud rate is input into the controller.

2. The optical transmit device according to claim 1, wherein the peaking is a characteristic that amplifies an amplitude component in the band characteristic.

3. The optical transmit device according to claim 1, wherein the driver changes the band characteristic by adjusting the peaking based on the adjustment value.

4. The optical transmit device according to claim 1, wherein the controller includes a memory that stores a table that defines a correspondence relationship between the baud rate and the adjustment value, and determines the adjustment value corresponding to the baud rate based on the table.

5. The optical transmit device according to claim 4, wherein the correspondence relationship is a relationship in which the adjustment value decreases as the baud rate decreases.

6. The optical transmit device according to claim 1, wherein the controller holds formula information that defines a correspondence relationship between the baud rate and the adjustment value, and calculates the adjustment value corresponding to the baud rate based on the formula information.

7. The optical transmit device according to claim 6, wherein the correspondence relationship is a relationship in which the adjustment value decreases as the baud rate decreases.

8. The optical transmit device according to claim 1, wherein
   the driver includes a first circuit that adjusts the peaking of low frequencies and a second circuit that adjusts the peaking of high frequencies, and
   the driver changes the band characteristic by adjusting a first voltage value applied to the first circuit and a second voltage value applied to the second circuit by changing the adjustment value.

9. The optical transmit device according to claim 1, wherein the driver changes the band characteristic of the optical transmit device.

10. The optical transmit device according to claim 1, wherein the driver changes the band characteristic of the conversion device.

11. The optical transmit device according to claim 1, wherein the controller that receives a setting of the baud rate and adaptively changes the adjustment value for peaking according to a received setting, the setting being input from an operation terminal.

12. The optical transmit device according to claim 1, wherein the adjustment value is a constant corresponding to a value of a voltage.

\* \* \* \* \*